(12) United States Patent
Mainetti et al.

(10) Patent No.: US 12,392,916 B2
(45) Date of Patent: Aug. 19, 2025

(54) HYBRID SEISMIC DATA ACQUISITION DEVICE AND CORRESPONDING METHODS

(71) Applicant: SERCEL, Carquefou (FR)

(72) Inventors: Dominique Mainetti, Carquefou (FR); Jean-Jacques Vignaux, Villeneuve de Rivière (FR)

(73) Assignee: SERCEL, Carquefou (FR)

( * ) Notice: Subject to any disclaimer, the term of this patent is extended or adjusted under 35 U.S.C. 154(b) by 112 days.

(21) Appl. No.: 17/921,705

(22) PCT Filed: May 5, 2021

(86) PCT No.: PCT/IB2021/000308
§ 371 (c)(1),
(2) Date: Oct. 27, 2022

(87) PCT Pub. No.: WO2021/224683
PCT Pub. Date: Nov. 11, 2021

(65) Prior Publication Data
US 2023/0168400 A1    Jun. 1, 2023

Related U.S. Application Data

(60) Provisional application No. 63/054,416, filed on Jul. 21, 2020, provisional application No. 63/020,178, filed on May 5, 2020.

(51) Int. Cl.
*G01V 1/18* (2006.01)
*G01V 1/16* (2006.01)

(52) U.S. Cl.
CPC ............. *G01V 1/162* (2013.01); *G01V 1/186* (2013.01); *G01V 2210/1427* (2013.01)

(58) Field of Classification Search
CPC . G01V 1/162; G01V 1/186; G01V 2210/1427
See application file for complete search history.

(56) References Cited

U.S. PATENT DOCUMENTS

| | | | |
|---|---|---|---|
| 6,024,344 A | 2/2000 | Buckley et al. | |
| 2007/0030007 A1* | 2/2007 | Moore | E21B 47/024 324/333 |

(Continued)

FOREIGN PATENT DOCUMENTS

| | | |
|---|---|---|
| CN | 101441274 A | 5/2009 |
| CN | 201348661 Y | 11/2009 |

(Continued)

OTHER PUBLICATIONS

"The Japanese OBS," Aug. 7, 2003, XP055828860, pp. 1-3.

(Continued)

*Primary Examiner* — Krystine E Breier
(74) *Attorney, Agent, or Firm* — PATENT PORTFOLIO BUILDERS PLLC

(57) ABSTRACT

It is proposed a seismic data acquisition device (400) intended to be placed on an ocean bottom floor, comprising a polymeric casing (412) defining a chamber that houses at least art of a data acquisition system (440, 444, 445); and a metallic device (414) in which the polymeric casing (412) is trapped, the metallic device (414) comprising two metallic beams (4141, 4142) that extend on opposite sides of the polymeric casing (412). It is also proposed a method for assembling such a device and a corresponding method for seabed seismic data acquisition.

19 Claims, 10 Drawing Sheets

(56) References Cited

U.S. PATENT DOCUMENTS

| | | | |
|---|---|---|---|
| 2010/0090685 A1* | 4/2010 | Andrieu | G01R 15/207 |
| | | | 324/117 R |
| 2013/0236760 A1* | 9/2013 | Deel | H01M 50/249 |
| | | | 429/99 |
| 2014/0211589 A1 | 7/2014 | Maxwell | |
| 2015/0362606 A1 | 12/2015 | Henman et al. | |
| 2016/0056645 A1* | 2/2016 | Henman | G01V 1/3852 |
| | | | 320/112 |
| 2016/0349386 A1 | 12/2016 | Naes | |
| 2018/0341033 A1 | 11/2018 | Olivier et al. | |
| 2020/0088757 A1* | 3/2020 | Olivier | G01P 15/18 |
| 2020/0295479 A1* | 9/2020 | Carrozzo, Jr. | H01R 4/24 |
| 2020/0326443 A1* | 10/2020 | Duboué | G01V 1/247 |
| 2023/0236333 A1* | 7/2023 | Faber | G01V 1/38 |
| | | | 367/178 |

FOREIGN PATENT DOCUMENTS

| | | | | |
|---|---|---|---|---|
| CN | 104360378 A | 2/2015 | | |
| CN | 104614066 A | 5/2015 | | |
| WO | WO-2017012989 A1 * | 1/2017 | | H02K 11/33 |

OTHER PUBLICATIONS

Kobou-Shibaken, "OBS: About the OBS I Nippon Marine Enterprises, Ltd.," Dec. 12, 2008, XP055828857, pp. 1-4.

Schmidt-Aursch et al., "German OBS pools: current status and ongoing developments," Oct. 28, 2016, XP055828865, 16 pages.

International Search Report/Written Opinion dated Aug. 10, 2021 in related/corresponding PCT Application No. PCT/IB2021/000308.

Office Action dated Dec. 31, 2024 in corresponding/related Chinese Application No. 2021800329515.

* cited by examiner

HYBRID SEISMIC DATA ACQUISITION DEVICE AND CORRESPONDING METHODS

BACKGROUND

Technical Field

Embodiments of the subject matter disclosed herein generally relate to methods and devices for seabed seismic acquisition, and more particularly, to an ocean bottom node.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

For marine acquisition, such a high-resolution image may be obtained with a seismic acquisition system as now discussed. The seismic acquisition system 100 includes, as illustrated in FIG. 1, plural ocean bottom nodes 102 distributed over the ocean bottom 101, by various means. Each ocean bottom node 102 includes e.g., a hydrophone 104 for detecting a pressure wave, a processor 106 for processing the detected waves, a memory 108 for storing the seismic data, and a power source 110 for providing electrical power to these components. A vessel 120 tows one or more seismic sources 122 at a certain depth in the water, relative to the ocean surface 121. The seismic source 122 is configured to generate seismic waves 124. The seismic waves 124 propagate into the subsurface 126 and get reflected and/or refracted at various interfaces 128 in the subsurface. The reflected waves 130 are then detected by the hydrophone 104, and recorded in the memory 108 of the ocean bottom node 102.

The traditional ocean bottom nodes are designed based on the water depth at which they operate and the required autonomy. Generally speaking, a lower autonomy is required for shallow water depth were the deployment methods use, for example, the Node-On-A Rope technique described in U.S. Pat. No. 6,024,344. However, a long autonomy node is required for deep water applications where the nodes are generally deployed and positioned by Remote Operated Vehicles so they need more battery capacity. To address these two divergent requirements, most of the existing nodes have been designed to have two different configurations, one for shallow water and one for deep water, which involves different battery capacity, size and volume.

A shallow ocean bottom node also includes a geophone, in addition to the hydrophone, for detecting seismic waves. A node that is used in water at a depth of less than 300 m is considered to be a shallow ocean bottom node. The geophone sensor is a particle motion sensor and the particle motion sensor detects a velocity (if implemented as a geophone) or acceleration (if implemented as a MEMS) of the water particles and can be omnidirectional or unidirectional. Depending on the node configuration, a shallow ocean bottom node can integrate one or several particle motion sensors and one hydrophone. Due to limitations inherent to gimbal mounted geophones, it is preferred to integrate 3C particle motion sensors.

For deep water seismic acquisition (most frequently from 700 meters to 3,000 meters), high battery autonomy is required because the node needs to be let on the ocean bottom floor during a long time. The casing for such a node also needs to be heavy and robust, generally made of titanium material to avoid corrosion and casing deformation due to the high hydrostatic pressure. The node design is also oversized by the use of reinforcement elements for resisting the high pressure. Thus, such nodes are very expensive.

For shallow water depth, the use of the titanium material and an oversized shape is not necessary. Thus, because an OBN for shallow water depth is deployed at a lower depth and for a shorter time operation, it is possible to use cheaper materials for the casing, for example, a polymeric material. However, it was observed that even for a deployment depth of less than 100 m, for the shallow OBN, the polymeric casing deforms and water seeps inside the casing, compromising the hosted electronics. In addition, under some circumstances, the weight of the polymeric casing is too light, and the shallow OBN might not achieve a good contact with the seabed.

Thus, there is a need to design an improved OBN for shallow water operations with a better compromise between the weight, cost, compacity, and reliability.

BRIEF SUMMARY OF THE INVENTION

According to an embodiment, there is a seismic data acquisition device, also referred to as an ocean bottom node, intended to be placed on an ocean bottom floor, the seismic data acquisition device comprising:
 a polymeric casing defining a chamber that houses at least part of a data acquisition system; and
 a metallic device in which the polymeric casing is trapped, the metallic device comprising two metallic beams that extend on opposite sides of the polymeric casing.

The ocean bottom node thus combines a polymeric based inner casing with a metallic outer device, for hosting electronics to be used for seismic data acquisition. Thanks to such a configuration of the node, it is not necessary to make the casing that includes the seismic acquisition system in Titanium which is an expensive material. The arrangement of the metallic device around the polymeric casing enables the node to resist to hydrostatic pressure that increases with water depth and to a corrosive environment.

Additionally, this metallic outer device adds dead weight to the Ocean Bottom Node (OBN) to provide a good coupling of the node on the seafloor.

The beams of the metallic outer device improve the mechanical resistance of the polymeric inner casing, and thus enables the polymeric inner casing to reliably resist to hydrostatic pressure. The assembly of the metallic outer device around the polymeric inner casing prevents bending and collapsing of the polymeric inner casing.

This hybrid solution allows to increase the mechanical resistance of the OBN compared to an equivalent product that would rely only on plastic parts, to withstand external hydrostatic pressure, and on the other hand avoid having to make the OBN in a fully metallic material.

According to embodiments, the metallic outer device that extends around the polymeric inner casing includes through passages or openings so that the quantity of metallic material used for making the metallic outer device that reinforces the polymeric inner casing can be limited.

According to embodiments, the metallic outer device presses the two polymeric halves one against the other thus improving the mechanical resistance and waterproofness of the assembled polymeric inner casing.

According to an optional feature, the metallic device further comprises two joining parts that join the metallic beams to form a metallic belt that girdles the polymeric casing, preferably in the middle zone of the polymeric casing.

According to an optional feature, the metallic device further comprises metallic arches that extend transversally from one metallic beam to the other metallic beam, preferably to form a grid over opposite lateral parts of the polymeric casing.

According to an optional feature, the metallic device has two halves that are attached one to the other with a fixation system, in a detachable manner, for instance with screws, each half of the metallic device having metallic beam elements that form with corresponding beam elements of the other half, said metallic beams of the metallic device.

According to an optional feature, the polymeric casing has two halves.

According to an optional feature, each half of the polymeric casing has an external collar element adapted to contact a corresponding external collar element of the other halve, when the two halves of the polymeric casing are assembled, to form said external collar of the polymeric casing.

According to an optional feature, passing holes are machined through the external collar elements and threaded holes are machined in at least one of the metallic beam elements, halves of the metallic outer device being connected one to the other by screws (436) that pass through the passing holes of the external collar elements to attach the beam elements together while sandwiching the external collar elements.

According to an optional feature, the passing holes machined inside the external collar elements are not threaded so that the screws extend from a beam element through the external collar elements, without being fixed to the external collar elements, to cooperate with corresponding threaded holes machined in the other corresponding beam ( ), so that the external collar elements are maintained one against the other by the pressure applied by the beam elements that sandwich said external collar elements.

According to an optional feature, the seismic data acquisition device comprises a protection bumper that is fixed to the metallic outer device, preferably to the metallic beams, the protective bumper covering part of the polymeric inner casing.

According to an optional feature, the protection bumper has two halves that are separated by the metallic beams of the metallic outer device.

According to an optional feature, the protection bumper has holes enabling water to enter the protection bumper.

According to an optional feature, the polymeric casing is made of polyurethane, polypropylene, polyethylene or polyamide.

According to an optional feature, the polymeric casing is reinforced by glass fibers incorporated in the polymer.

According to an optional feature, the metallic device is made of copper alloy, notably bronze.

According to an optional feature, the device includes a hydrophone that is attached to the polymeric inner casing, to electrically communicate with electronics embedded in the polymeric inner casing.

According to an optional feature, said at least part of the data acquisition that is housed in the polymeric inner casing includes a management card configured to communicate through a port with a power source and/or a data server on shore, the port being closed with a cap, when the node is deployed in water, to prevent the water to reach any electrical contact.

According to a particular embodiment, the metallic device is sized so that the arches extend inside corresponding grooves of the polymeric casing.

According to another embodiment, there is a method for assembling a seismic data acquisition device, also referred to as an ocean bottom node, intended to be placed on an ocean bottom floor, the method comprising:

providing a data acquisition system and a polymeric casing that houses at least part of the data acquisition system; and providing a metallic device that comprises two metallic beams adapted to extend on opposite sides of the polymeric casing; and imprisoning the polymeric casing into the metallic device.

According to another embodiment, there is a method for seabed seismic data acquisition, preferably for water depth between 100 and 700 meters, the method comprising the steps of providing a seismic data acquisition device, as proposed above; and placing the seismic data acquisition device on an ocean bottom floor.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
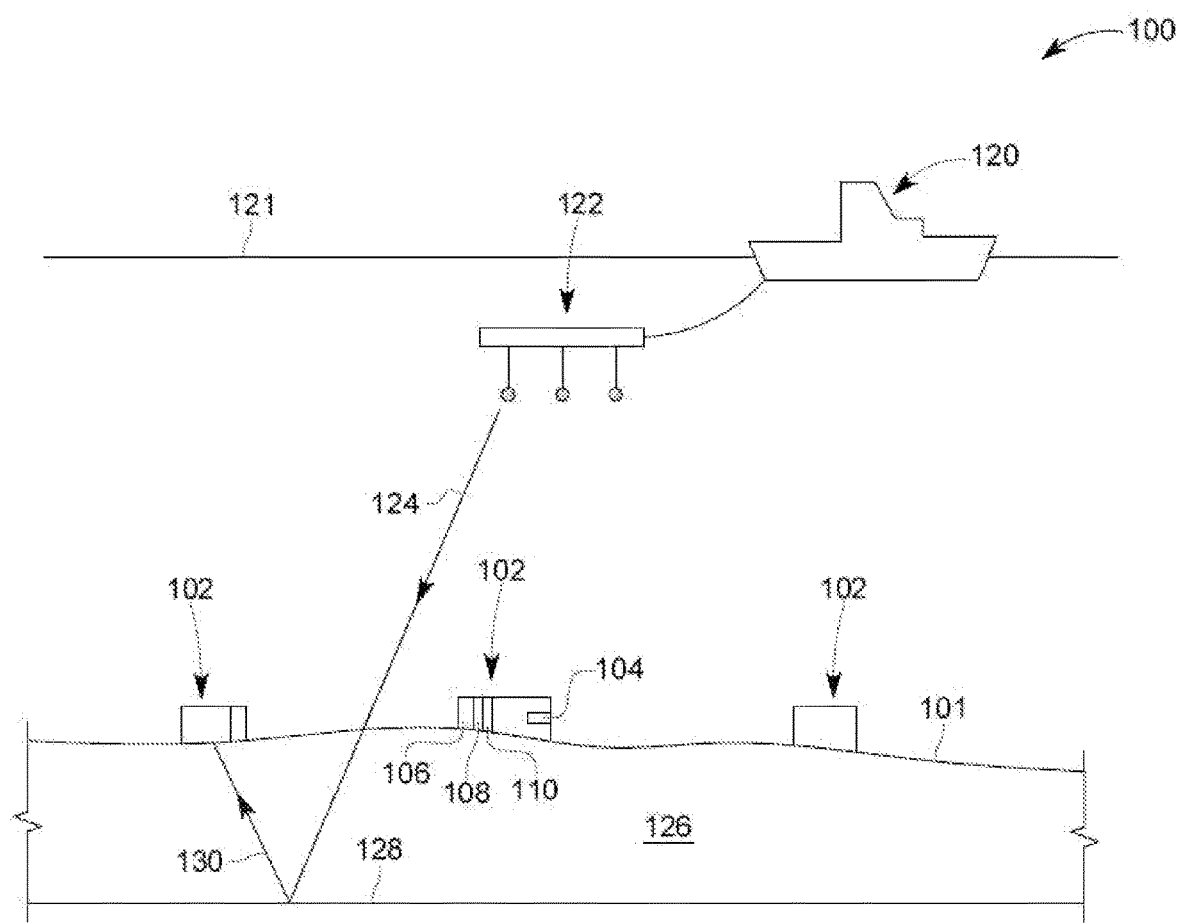
FIG. 1 is a schematic diagram of a seismic data acquisition system that uses ocean bottom nodes as known in the background art.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a shallow ocean bottom node that records seismic data. However, the embodiments to be discussed next are not limited to a shallow ocean bottom node that records seismic data, but may be applied to other nodes that collect different data.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel shallow ocean bottom node that is configured to record seismic data has most of its electronics housed in an inner polymeric casing. The inner polymeric casing is made from two or more parts and these parts are configured to fit together to form an inner chamber that is watertight. A metallic outer device is configured to enclose the inner polymeric casing and to ensure that the various parts of the inner polymeric casing are staying in tight contact with each other, so that the water tightness is maintained. In addition, the mass of the metallic outer device is selected in such a way that the entire ocean bottom node has a negative buoyancy so that the node achieves a firm contact with the ocean bottom. According to embodiments, the outer metallic casing is configured to encircle the inner polymeric casing. The inner casing is water tight and the outer metallic casing is preferably not water tight.

With reference to the figures, it is proposed a seismic data acquisition device 400, also referred to as an ocean bottom node (OBN), intended to be let on an ocean bottom floor, for acquisition of seismic data.

The seismic data acquisition device 400 includes a polymeric inner casing 412 that houses at least part of a data acquisition system. The seismic data acquisition system comprises a battery 440 and electronics 444 for seismic data acquisition. Electronics 444 may include a processor, memory, and at least one seismic sensor, for instance a particle motion sensor 445. The at least one seismic sensor can comprise a MEMS sensor or a geophone.

As explained hereafter, the seismic data acquisition system can also comprise a hydrophone 470 that is connected to the electronics 444, but that extends outside the polymeric inner casing 412 to be submerged by water to measure water pressure variations.

In the illustrated embodiments, the polymeric inner casing 412 has two inner halves 412A, 412B intended to be joint together so as to prevent water from entering the chamber, defined by the halves 412A, 412B, that includes said at least part of the data acquisition system.

The seismic data acquisition device 400 further includes a metallic device 414, referred to as a metallic outer device 414 since the metallic outer device 414 is positioned on the outside of the polymeric inner casing 412, and, in present embodiment, in contact with the polymeric inner casing 412. According to a particular aspect in this embodiment, metallic arches 418 (described below) of the metallic outer device 414 conform to the polymeric inner casing 412. However, in another embodiment as in the embodiment illustrated at FIG. 6, metallic arches 418, that provide protection in the event of an impact, do not contact the polymeric inner casing 412 since the fixing of the metallic outer device 414 (in particular the metallic belt) is made directly to the outer lip (external collar) of the polymeric inner casing 412.

For example, in one embodiment, the polymeric material may be plastic or rubber—as e.g. polyamide PA, polyurethane PU, polyethylene PE or polypropylene PP which might be reinforced e.g. with glass fibers—and the metallic material may be an aluminium-copper alloy. Other polymeric and/or metallic materials may be used.

The metallic outer device 414 can comprise two halves 414A, 414B that are positioned around the polymeric inner casing 412, and that are fixed one to the other by mechanical fixation such as screws 436, so that the fixation of the halves one to the other lead to the imprisoning of the polymeric inner casing 412. The metallic outer device 414 is thus attached to the polymeric casing, and mechanically strengthen the polymeric casing 412 that is trapped in the metallic outer device 414.

According to embodiments, the metallic outer device 414 is coupled to the polymeric inner casing by sandwiching or confining the polymeric inner casing 412 between the two halves 414A, 414B of the metallic outer device 414. The two halves 414A, 414B of the metallic outer device 414 can then be attached one to the other by screws 436, by direct contact between the two halves 414A, 414B of the of the metallic outer 414 as illustrated in the embodiment of FIGS. 2 to 5. Preferably, attachment is achieved by having the halves 414A, 414B of the metallic outer device 414 that contact opposite sides of an external collar (or lip) 4124 of the polymeric inner casing, the screws passing through holes 4125 machined in the external collar, as illustrated in the embodiment of FIGS. 6 to 8. Thus, the screws 436 can pass through a part of the polymeric inner casing 412, that does not communicate with the chamber defined by the polymeric inner casing 412, to prevent water introduction in the chamber through the screws. Such a part can be the external collar 4124 of the polymeric casing 412 that is sandwiched between the halves 414A, 414B of the metallic 414 device.

According to particular embodiments and as illustrated at FIGS. 6 to 8, the two halves 414A, 414B of the metallic outer device 414 are positioned around the polymeric inner casing 412 and against the external collar 4124 of the polymeric inner casing 412. The two halves 414A, 414B of the metallic outer 414 device can then be fixed one to the other by screws that pass through the external collar 4124. In the illustrated embodiments of FIGS. 6 to 8, the external collar corresponds to the assembly of two external collar elements 4124A, 4124B of two halves part of the polymeric inner casing. The two external collar elements 4124A, 4124B are maintained one against the other by the force applied by the two halves 414A, 414B of the outer metallic device 414 that sandwiches the two halves 412A, 412B of the polymeric inner casing. Each external collar element 4124A, 4124B is preferably integrally formed with a half 412A, 412B of the inner polymeric casing for instance by molding; a seal may be present.

As illustrated in the embodiments of FIGS. 2 to 5 and FIGS. 6 to 8, the metallic outer device 414 comprises two metallic beams 4141, 4142 that extend on opposite sides of the polymeric inner casing 412. The opposites sides on which the metallic beams 4141, 4142 extend are the main faces of the polymeric inner casing 412 corresponding to top and bottom sides. Note that "top" and "bottom" are used with respect to the illustration: in use, either the top or the bottom sides can face the ocean bottom floor.

Preferably, the polymeric inner casing 412 is rectangular parallelepiped in shape and the metallic beams 4141, 4142 extend parallel to a longitudinal axis of the polymeric inner casing 412.

The metallic outer device 414 further comprises metallic arches 418 that each extends transversally from one metallic beam 4141 to the other beam 4142. The arches 418 thus form grids that cover the opposite lateral parts of the polymeric inner casing 412. The arches 418 can be in contact with the polymeric inner casing 412, thus enabling to mechanically strengthen the parts of the polymeric casing 412 that are not covered by the beams, while using limited amount of metal and enabling access, between the arches, to some part of the polymeric inner casing or to element(s) connected to the polymeric casing 412, such as a hydrophone 470 or a cap 464 that closes a connecting port 462 of the polymeric inner casing. An operator thus does not have to remove the metallic outer device 414 from the polymeric inner casing 412 to have access to the hydrophone 470 or to the cap 464.

In the illustrated embodiment, each arch 418 of the metallic outer device 414 has a U shape. Branches of the U are fixed, preferably by molding or welding, to the metallic beams 4141, 4142. In the illustrated embodiment, arches of the metallic outer casing 414 each extends from one beam to another, developing around a lateral side of the polymeric inner casing.

According to an embodiment and as illustrated at FIGS. 6 to 8, the metallic beams 4141, 4142 are joint one to the other by metallic parts 4143, to form an annular metallic element, referred to as a metallic belt 4200. The metallic belt 4200 surrounds a part of the polymeric inner casing 412. In the illustrated embodiments, the metallic belt 4200 surrounds the central longitudinal part of the polymeric inner casing 412. In other words, the beams are prolongated with joining elements, visible on lateral sides of the polymeric casing, thus forming the metallic belt. In particular, the metallic belt reinforces the polymeric inner casing in the region of the joint plane of the two halves 412A, 412B of the polymeric inner casing 412.

The metallic belt 4200 girdles the polymeric inner casing. The metallic belt 4200 can be formed by two metallic belt elements 4200A, 4200B. The two metallic belt elements 4200A, 4200B can be positioned from either side of the external collar 4124 of the polymeric inner casing 412. In the embodiments of FIGS. 6-8, the metallic belt elements 4200A, 4200B are attached one to the other with screws 436 passing through the external collar 4124 of the polymeric inner casing 412.

In other words, the metallic belt 4200, and more particularly the beams 4141, 4142 form a backbone, while the bars form ribs, around the inner polymeric casing 412. The metallic belt 4200 and the arches form thus a shell, with apertures defined between the arches, that imprison the polymeric inner casing 412. Spaces between the arches that form said apertures enable to limit the amount of material used for making the metallic outer device and provide easy access to some parts of the polymeric inner casing 412.

In one embodiment, the polymeric inner casing 412 is made entirely of the polymeric material while the outer device 414 is made entirely of a metal material.

Figure 2:
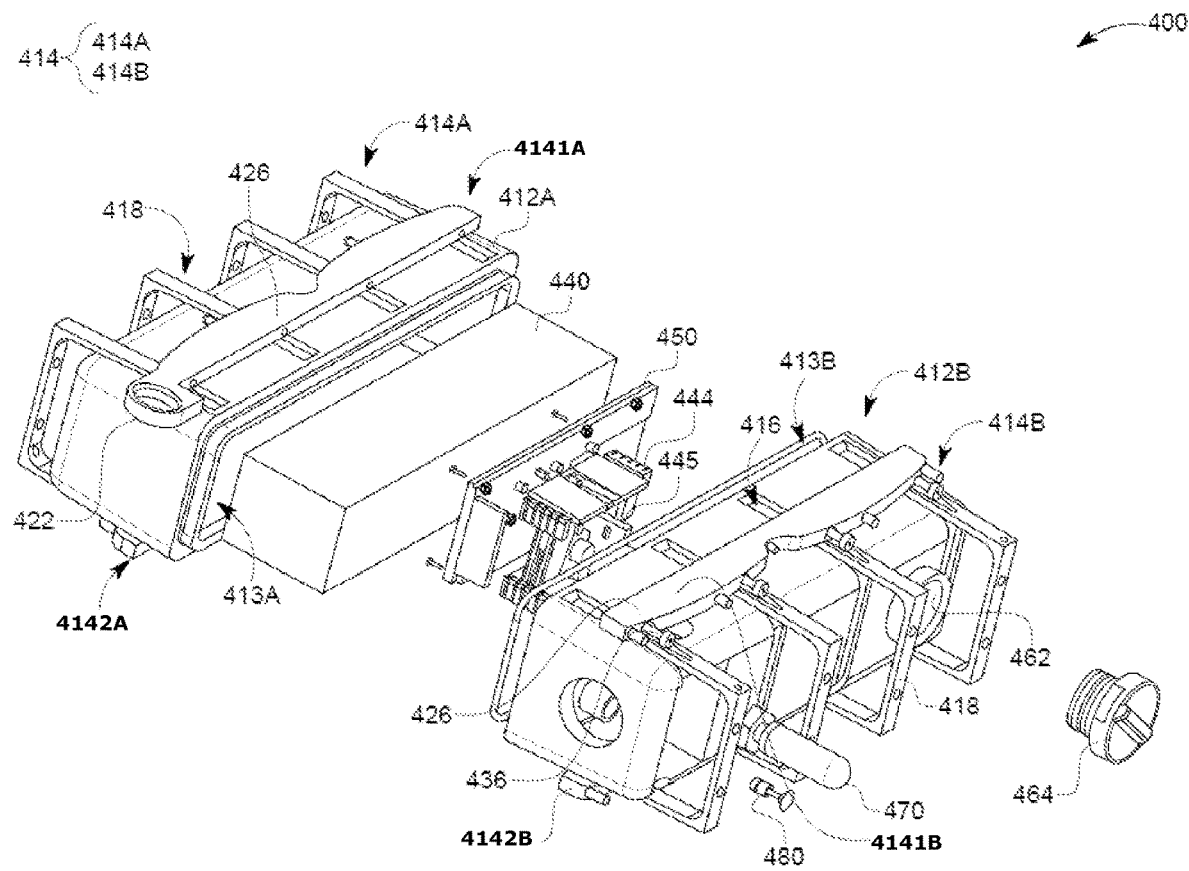
FIG. 2 illustrates an exploded view of a hybrid ocean bottom node that has an inner polymeric casing and an outer metallic device according to an embodiment of the invention.
Figure 3:
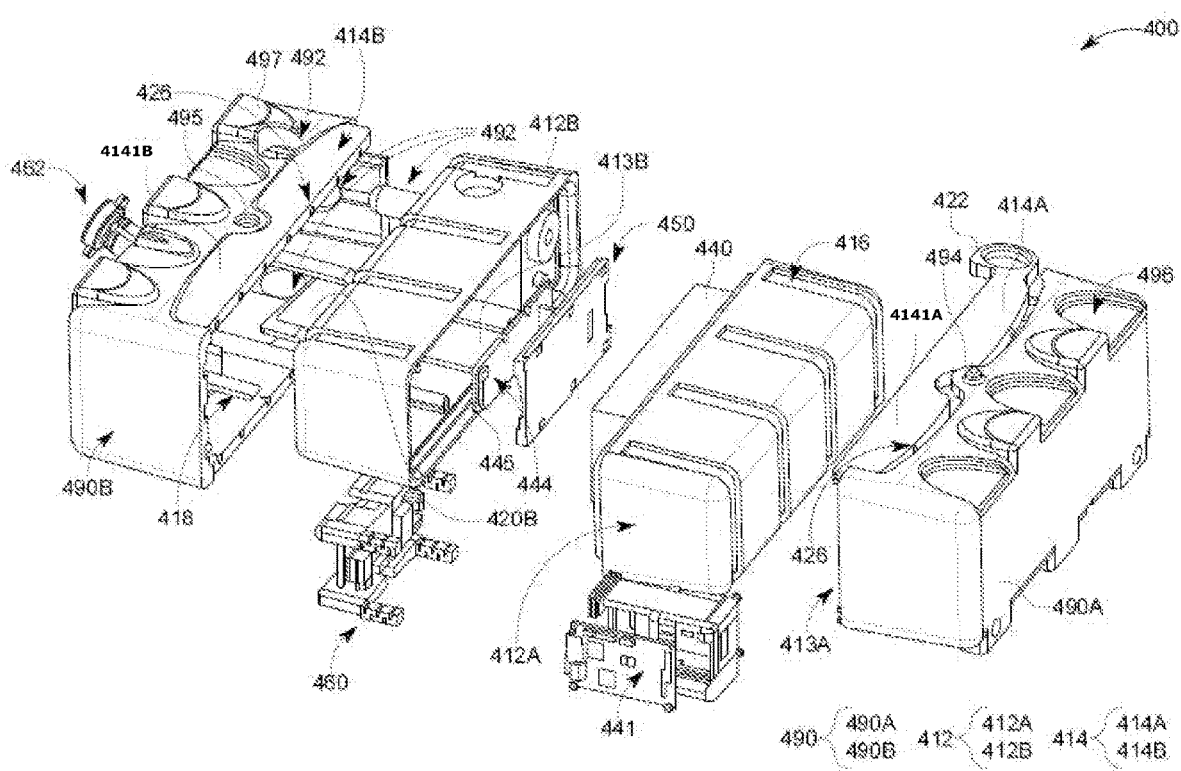
FIG. 3 illustrates the hybrid ocean bottom node of FIG. 2 with additional bumper components.

According to embodiments, each of the inner halves 412A and 412B of the polymeric inner casing 412 has one or more grooves 416 formed on an external surface as illustrated for instance in FIG. 2. Each of the outer halves 414A and 414B of the metallic outer device has a corresponding one or more tongue or arch 418. The embodiment illustrated in FIGS. 2 and 3 shows that each inner half 412A and 412B has four grooves 416 and each of the metallic outer halves 414A and 414B has four arches 418. However, one skilled in the art would understand that any number of grooves and arches can be used for a given half. According to another embodiment, the polymeric inner casing 412 may have no grooves but a particular texture, for instance comprising ribs for a mechanical reinforcement of the structure of the polymeric inner casing 412. The metallic outer device 414 can be sized so that each of the arches 418 fits tightly inside a corresponding groove 416 when an outer half is placed over a corresponding inner half, as illustrated in FIG. 2.

In the illustrated embodiments of FIGS. 2 to 8, each half 414A, 414B of the metallic outer device 414 has a first beam element 4141A, 4142A, a second beam element 4141B, 4142B, and the arches 418 extend from the first beam element to the second beam element. The assembly of the first beam elements 4141A, 4142A forms a first beam 4141, and the assembly of the second beam elements 4141B, 4142B forms a second beam 4142. Thus, the arches 418 connect the two beams 4141A, 4142A to form the outer half 414A, and opposite arches 418 connect the two beams 4141B, 4142B to form the outer half 414B. One of the first or second beam elements of one of the outer halves 414A, 414B may also have a hook or loop 422, as seen in FIG. 3, which is used as a mechanical connection when the node is deployed underwater.

The metallic beam elements 4141A, 4142A, 4141B, 4142B of each half 414A, 414B of the metallic 414 device comprises two metallic beam elements that extend on the opposite top and bottom sides of the polymeric casing 412.

In the embodiment and as illustrated at FIGS. 6 to 8, for each half 414A, 414B of the metallic device, the metallic beam elements 4141A, 4142A, 4141B, 4142B are joint one to the other by metallic part elements 4143A, 4143B to form the metallic belt element 4200A, 4200B. when attached one to the other, the metallic belt elements 4200A, 4200B form said metallic belt 4200. The metallic part elements 4143A, 4143B form the metallic part 4143.

Each metallic belt element of a half of the metallic device, is configured to come into contact with an external collar element of one of the halves of the polymeric casing. This metallic belt improves the waterproofness of the two halves of the polymeric casing when assembled together, as the metallic belt has two halves that each surrounds one of the halves of the polymeric inner casing, while the two halves of the metallic belt push one half of the polymeric inner casing against the other when said two halves of the metallic belt are attached one to the other.

In one application, each half of the metallic outer device is shaped as a strap to be placed around the corresponding half of the polymeric inner casing, and when the two metallic outer halves are mechanically connected to each other, the polymeric inner halves also become connected to each other, without having to use any screw directly between the inner halves. In this embodiment, the two inner polymeric halves directly connect to each other because the outer metallic halves directly connect to each other. As illustrated in the embodiments of FIGS. 2-5, the first and second metallic outer halves can thus maintain the first and second inner polymeric halves together without screw extending from the first inner polymeric half to the second inner polymeric half. Note that in the embodiment of FIG. 6-8, the holes 4125 provided in the external collar 4124 can be dimensioned so as to simply let the screws pass through the external collar without exerting a direct pushing force on the external collar. The pushing forces applied on opposite sides of the external collar is provided by the assembly of the beam elements (or corresponding belt elements) that are connected one to the other by the screws.

According to embodiments and as illustrated at FIGS. 2-5 and 6-8, except for the first and second outer metallic halves, nothing forces the first and second inner polymeric halves to stay connected to each other. In other words, first and second inner polymeric halves are connected to each other exclusively due to the first and second outer metallic halves being attached to each other by screws.

As explained above, the first and second beam elements 4141A, 4141B and 4142A, 4142B of each of the metallic outer halves 414A, 414B have holes 426 for allowing corresponding screws 436 to mechanically connect one of the two metallic outer halves 414A and 414B to the other. By mechanically connecting the two metallic outer halves 414A and 414B directly to each other, the polymeric inner halves 412A, 412B are forced to mechanically abut against each other, thus forming a first sealed internal chamber 413A, inside the first inner half 412A, and a second sealed internal chamber 413B, inside the second inner half 412B. As in the embodiment of FIGS. 2 and 3, the holes 426 can be made through or in the metallic beams 420A and 420B, and not through the polymeric inner casing. This offers increased mechanical strength to the OBN 400. Sealing is improved because the two halves of the polymeric casing 412 are forced one against the other, so that seals are compressed. In other words, the screws 436 can pass through at least part of the outer metallic device, from one beam element to another corresponding beam element and not through the inner polymeric casing.

In one application, there is at least one screw 437 associated with at least one, preferably arch 418, as illustrated in FIG. 6. Said at least one screw 437 can be used to attach the external bumper for instance illustrated at FIG. 7.

According to another embodiment illustrated with FIGS. 6 to 8 and as discussed above, the mechanical strength of the inner polymeric casing is further improved by providing each of the halves of the inner polymeric casing 412 with an external collar element 4124A, 4124B. The collar elements 4124A, 4124B are intended to contact one another for forming an external collar 4124 that is sandwiched between the beam elements 4141A, 4141B and 4142A, 4142B. Each external collar element 4124A, 4124B extends around the body of the corresponding half of the inner polymeric casing 412 and is provided with holes 4125 that let the screws 436 pass through the external collar elements from one beam element of a half of the metallic outer device to the corresponding beam element of the other half of the metallic outer device.

In the embodiment of FIGS. 6-8, the metallic beam elements 4141A, 4142A of a half 414A thus contact one of the external collar element 4124A, that extends on the side of a half of the polymeric inner casing on which the metallic beam elements of said half are applied. The other opposite metallic beam elements 4141B, 4142B contact the other external collar element 4124B that extends on the opposite side of the half of the polymeric inner casing on which said other metallic beam elements 4141B, 4142B are applied.

According to embodiments and as illustrated in particular at FIGS. 2 and 3, the battery 440 is placed inside the first sealed polymeric internal chamber 413A and electronics 444 (that may include a processor, memory, and a particle motion sensor 445, i.e., a MEMS sensor or a geophone) is placed in the second sealed polymeric internal chamber 413B. The two polymeric chambers 413A and 413B can be separated by a strength plate 450, which is made of a strong material, for example, titanium or any other—also "hard" plastic or polymeric material could be envisioned. The strength plate 450, by being placed between the first and second inner halves 412A and 412B, offers increased structural support to the inner polymeric casing. In other words, when the external pressure (hydrostatic pressure) is large, for example, when the node is located at a depth between 75 to 100 m from the water surface, the external pressure would not be able to bend the connecting lips of the two inner halves 412A and 412B due to the presence of the strength plate 450. Further, the strength plate 450 is used to achieve a good coupling with the electronics 444, which is connected to the MEMS or geophone sensor. As the strength plate is made of a strong material and does not deform, the sensor can be coupled directly to this plate. In one application, the strength plate 450 is sized to fully close the second internal chamber 413B, so that there is no open passage between the first internal chamber 413A and the second internal chamber 413B.

Further electronic components may be placed inside the first and second internal chambers 413A and 413B. For example, electronics 444 can comprise a power and data retrieval card (management) that may be placed inside the second polymeric internal chamber 413B, for managing the power from the battery 440 and also the data exchange with a base, when the OBN is on shore and is being prepared for deployment. In this regard, the card can be configured to communicate through a port 462 with a power source (not shown) and/or a data server (not shown) on shore. The power source is used to recharge the battery 440 and the data server is used to receive all the recorded seismic data from the node 400. The port 462 is closed with a cap 464, as shown in FIG. 3, when the node is deployed in water, to prevent the water to reach any electrical contact. In embodiments, as further illustrated in FIG. 4, the battery 440 may have its own power management card, which is deployed together with the battery in the first sealed inner chamber 413A.

As illustrated at FIGS. 2, 4, 6, 7 and 8, the hydrophone 470 can be attached to the second inner polymeric half 412B, to electrically communicate with the electronics 444. A pressure release valve 480 may also be attached to the second polymeric inner half 412B. The pressure release valve 480 can be used as a safety element in the event of a battery leak, which could increase the pressure inside the node. The pressure release valve 480 can also be used to equalize a pressure between the second inner chamber 413B and the ambient, after the node is retrieved on the mother vessel.

Figure 4:
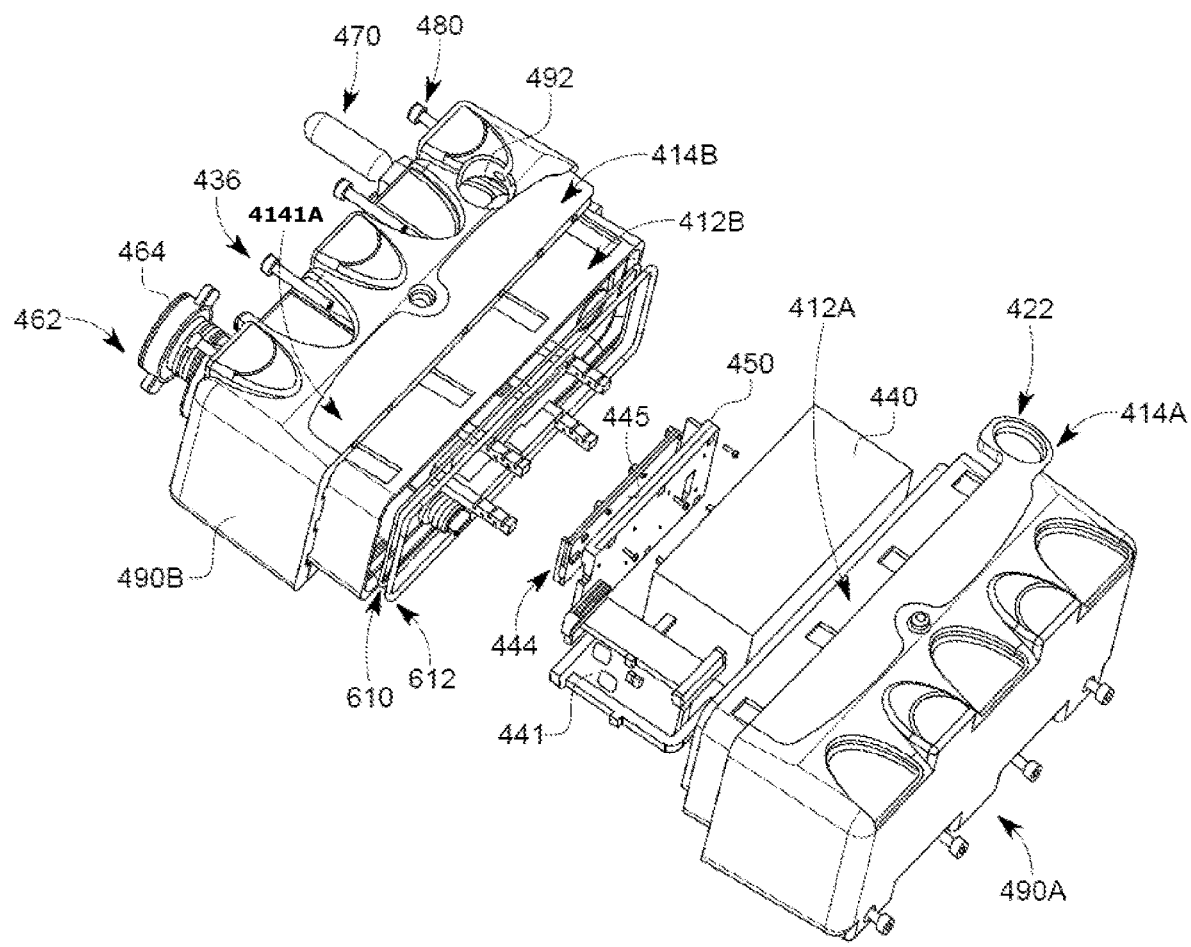
FIG. 4 illustrates the hybrid ocean bottom node of FIG. 3 according to another view.

The polymeric inner casing 412 and the metallic outer device 414 may be partially protected with a protection bumper 490 as illustrated in the embodiment of FIG. 4 or in the embodiment of FIGS. 7 and 8. The protection bumper 490 may have a first half bumper 490A that is configured to cover a part of the first polymeric inner half 412A and a part (preferably the arches 418) of the first metallic outer half 414A.

The two halves 490A, 490B of the protection bumper 490 are separated from each other by the metallic beams 4141, 4142 of the metallic outer device 414. Each half of the protection bumper 490 covers the lateral parts of the polymeric inner casing that extend from either side of the metallic beams. The protection bumper 490 covers the arches of the metallic outer casing 414.

In the assembled state of the node, the edge that defines the main opening of a half bumper 490A, 490B, that is intended to cover a part of a half 412A, 412B of the polymeric casing 412, is in contact with the metallic belt elements 4200A, 4200B.Thus the first half bumper 490A is configured to be positioned by an edge 498, preferably a peripheral edge, against a corresponding edge 4149 of the metallic belt element (or metallic beam elements) of the first metallic outer half 414A. The second half bumper 490B is configured to cover part of the second polymeric inner half 412B and part of the second metallic outer half 414B. According to a particular aspect, the second half bumper 490B is also configured to be positioned by an edge, preferably a peripheral edge, against a corresponding edge of the metallic belt element (or metallic beam elements) of the second metallic outer half 414B.

The protection bumper 490 may be made of an elastic material, for example, thermo-polyurethane (TPU) material. One reason for having this kind of material over part of the inner polymeric casing, that is fixed to the outer metallic device is to protect the MEMS sensor 445, and all electronics, from unwanted shocks. Also, the clock of the electronics 444 is very sensitive and needs protection from shock. A shock can happen when the node is deployed in the water, as the node falls freely to the ocean bottom. The elastic material is configured to absorb part of the shock.

FIG. 4 and FIGS. 7-8 further show that plural holes 492 are formed thorough the bumper 490 for allowing the ambient water to freely move to the hydrophone 470, so that the hydrophone is in direct contact with the water. It is noted that the hydrophone can measure the water pressure only if in direct with the water particles.

In one application, for the purpose of stacking the node 400 in top of another node and stacking other nodes on top of the node 400 (when store on the mother vessel or another facility), one or more stacking features are formed into the bumper 490. For example, as shown in FIG. 4, a cylinder 494, potentially a screw, is added to the first half bumper 490A and into the corresponding external half and a corresponding hole 495 is added to the second half bumper 490B. In this way, the screw from a next node (not shown) fits into the hole 495 and a hole from the next node receives the screw 494, thus preventing the next node to slip off from the node 400. In addition, the cylinder 494 fixes the bumper 490 to the external casing 414. In one application, the bumper 490 may be manufactured to have plural depressions 496 and plural crests 497 so that the crests from the other node fit inside the depressions 496 and the crests 497 fit into the depressions of the other node. These features further prevent the slippage of one node from another when the nodes are stacked on board the mother vessel or on shore.

As illustrated at FIG. 4, and applicable to other embodiments, that shows the two inner polymeric halves 412A and 412B, and the two outer metallic halves 414A and 414B being ready to be connected to each other, for ensuring a water tight seal between the halves, i.e., that no water enters inside the first and second inner chambers 413A and 413B, at least one seal 610 can be placed between the inner halves. A second seal 612 can be added in addition to the first seal 610 for making the inner chambers water proof. According to embodiments, the node has no acoustic pinger, which makes the entire node more compact.

Figure 9:
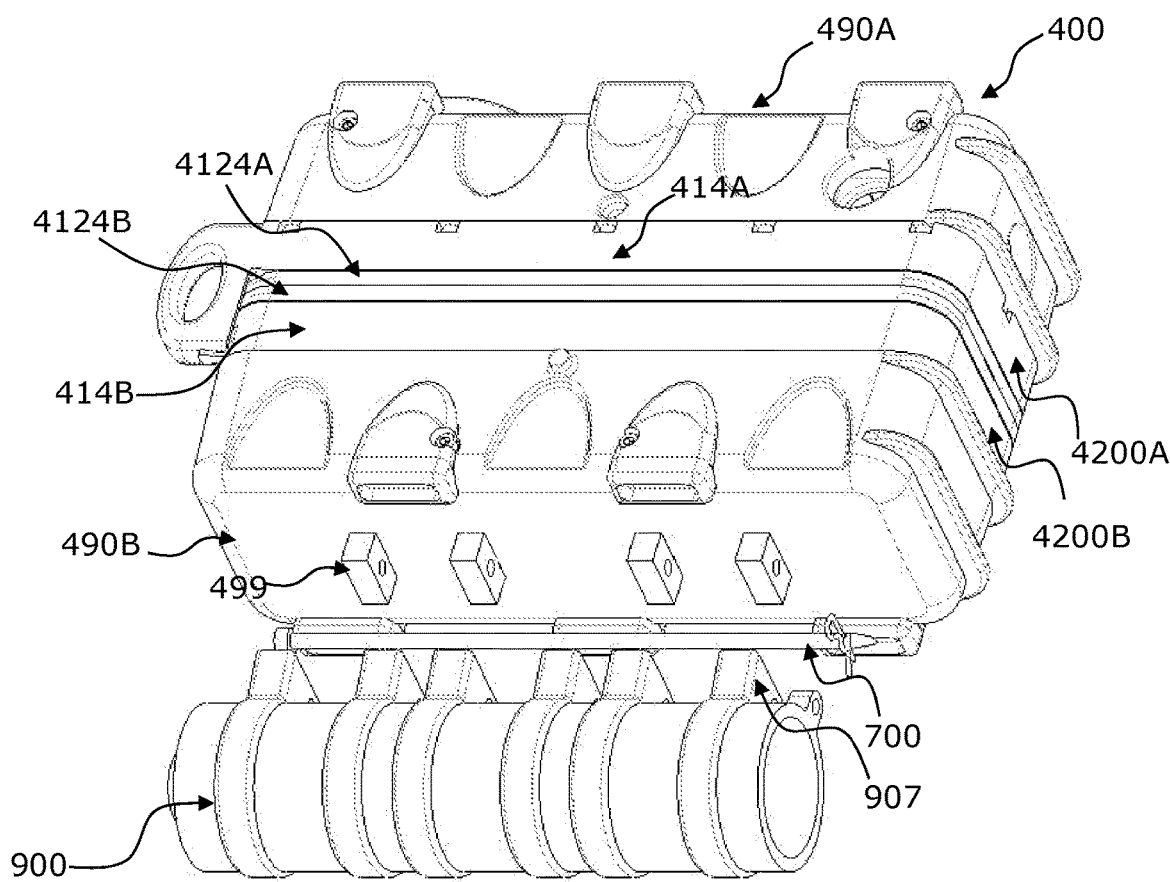
FIG. 9 illustrates another embodiment of a hybrid ocean bottom node, wherein a pinger is attachable to a protection bumper of the hybrid ocean bottom node.

However, as also illustrated in FIG. 9, the option for an additional (removable) pinger might be foreseen. The bumper 490 might thus comprise some attachment means for coupling a pinger element. The pinger 900 is attachable to the protection bumper 490 by a connecting system. The connecting system preferably comprises a locking rod 710 that can pass through holes provided through teeth 499 of the bumper 490 and holes provided through teeth 907 of the pinger 900. The teeth 499 of the pinger 490 are interlinked with the teeth 499 of the bumper 490. This solution offers the advantage of keeping the compacity of the OBN, but other attachment means can be used.

Figure 5:
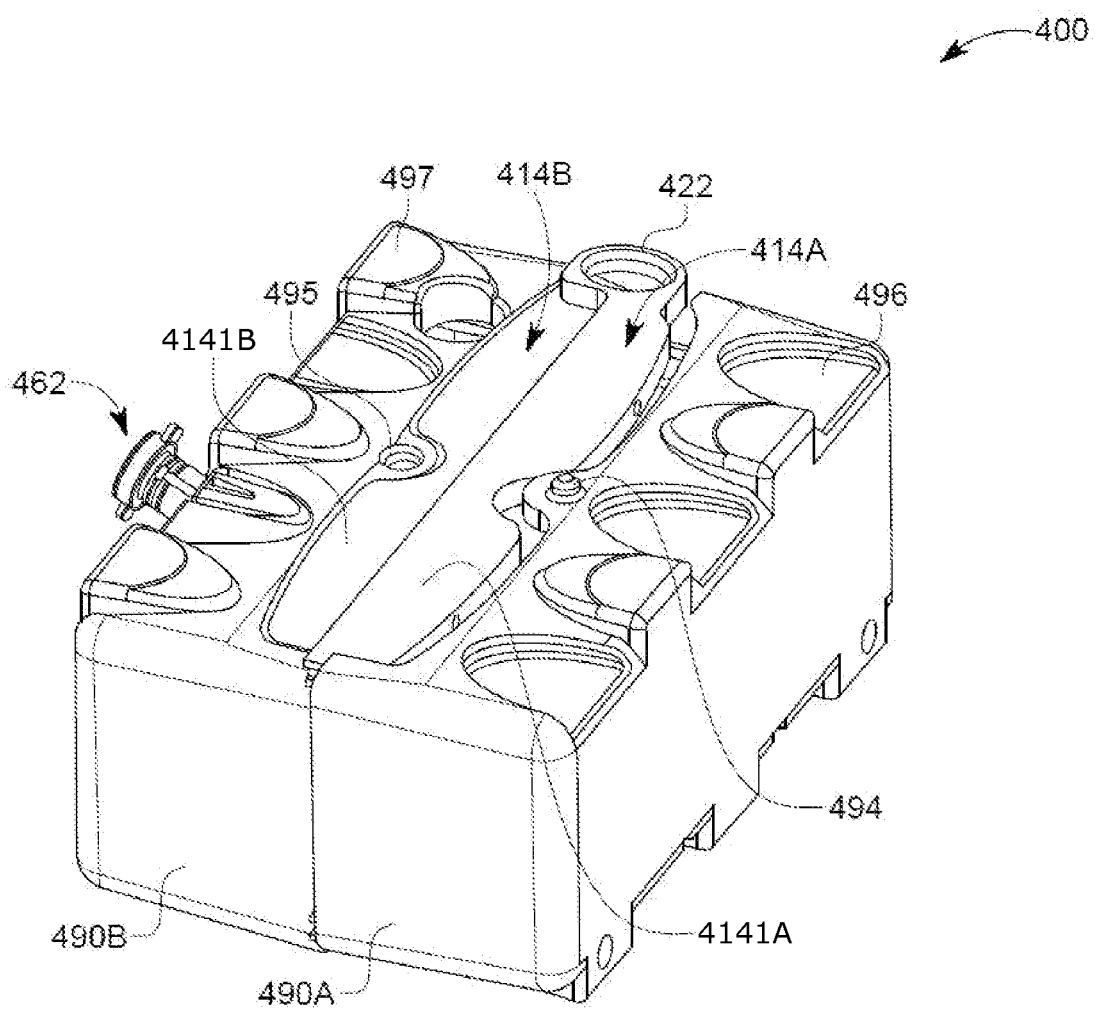
FIG. 5 illustrates the hybrid ocean bottom node of FIG. 4 in an assembled state.
Figure 6:
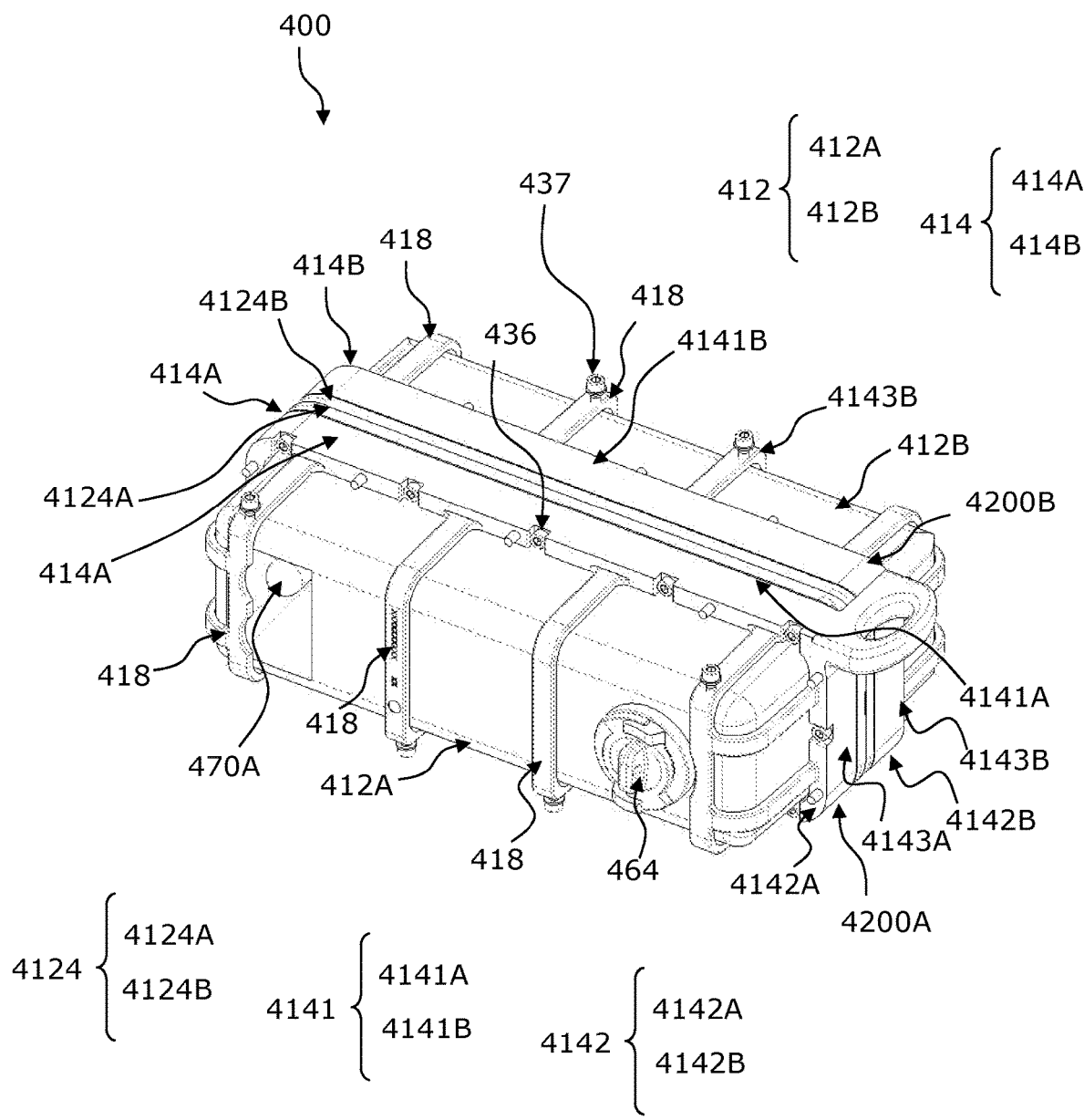
FIG. 6 illustrates a hybrid ocean bottom node that has an inner polymeric casing and an outer metallic device, according to another embodiment of the invention, after the halves of the outer metallic casing have been attached to each other so that the halves of the inner polymeric casing are also joint one to the other by the metallic outer device.
Figure 7:
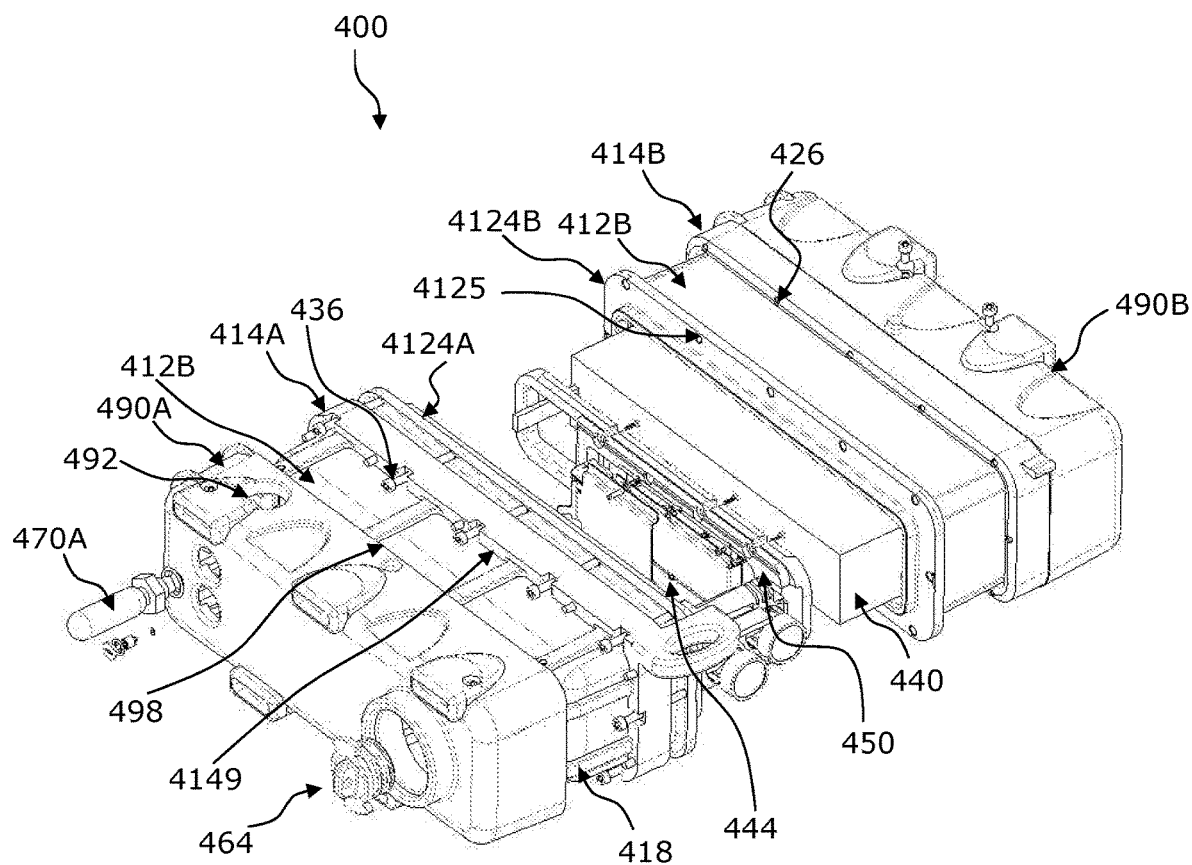
FIG. 7 illustrates an exploded view of a hybrid ocean bottom node that has an inner polymeric casing and an outer metallic device, as for the node of FIG. 6, and further a protection bumper, according to another embodiment of the invention.
Figure 8:
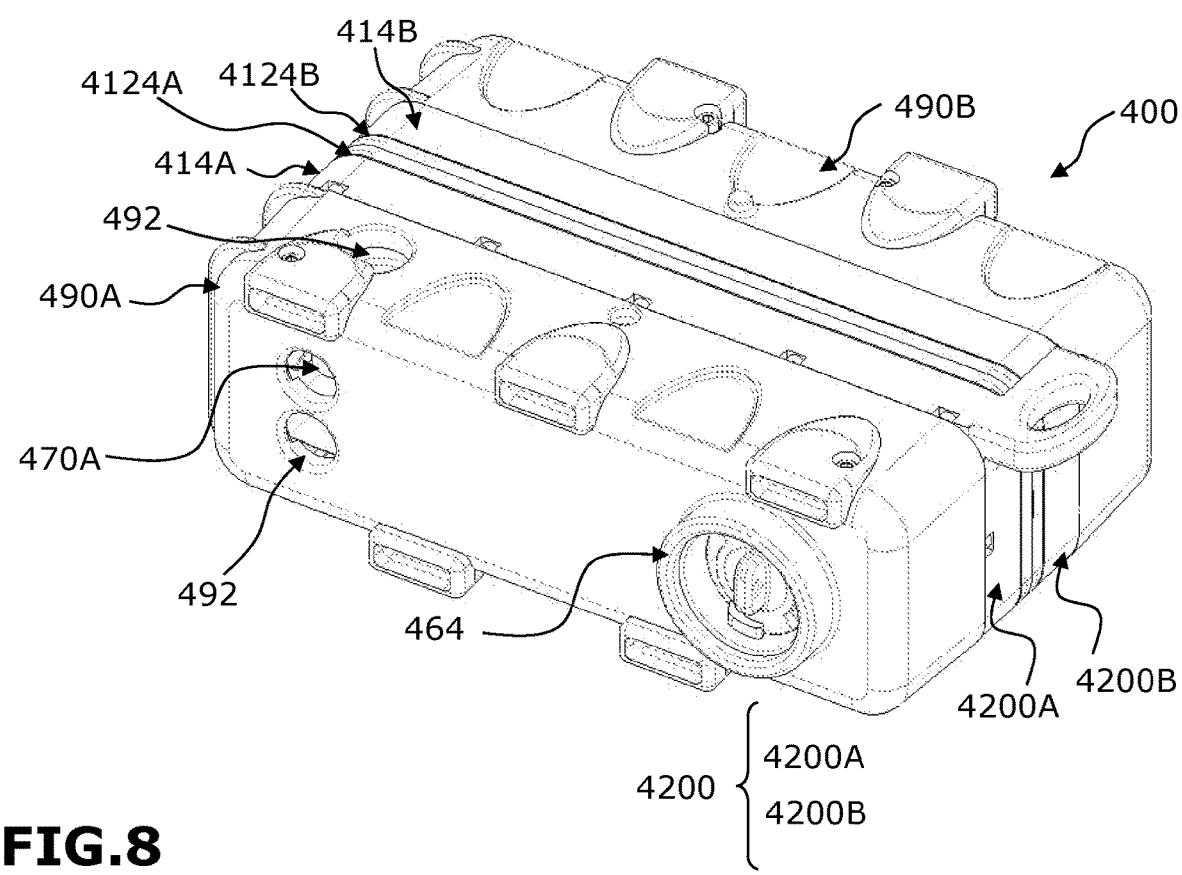
FIG. 8 illustrates the hybrid ocean bottom node of FIG. 7, in the assembled state, wherein the halves of the protection bumper are attached to the halves of the outer metallic device.

When the screws 436 are fully engaged in the corresponding metallic beams 420A and 420B (or metallic belts 4200A, 4200B), the first and second metallic outer halves 414A and 414B force the first and second polymeric inner halves 412A and 412B to directly engage each other, and the metallic beam elements from the first metallic outer half are in direct contact to the metallic beams of the second metallic outer half, as illustrated in FIG. 5, or in indirect contact by the external collar 4124 that is sandwiched by the metallic beams, as illustrated in the embodiment of FIGS. 6-8.

According to embodiments, the metallic outer halves 414A and 414B not only allow the user of the node to balance/ballast the node, by selecting/controlling their weight, but they also hoop around the polymeric inner halves 412A and 412B to improve their coupling.

In addition, by having the screws 436 connect directly or indirectly (by simply passing through holes of the external collar without being screwed in said external collar) the metallic beam elements of the outer metallic halves 414A and 414B, a better and more reliable connection between the two halves 412A, 412B is achieved, instead of having the screws connect by screwing into the polymeric material, as in traditional nodes.

In one application, the external metallic halves 414A and 414B are sized to tightly fit around the internal polymeric halves 412A and 412B so that no gaps or empty chambers are formed between the internal surfaces of the metallic outer halves and the external metallic surfaces of the inner halves. As visible in particular at FIG. 2, the metallic device has space(s) defined between parts of the metallic device. In particular the arches 418 are spaced from one another thus defining space or openings between them. For instance, such spaces enable to access to some elements connected to the polymeric casing, such as the hydrophone 470, the pressure release valve 480 and/or the cap 464. Further, by manufacturing the external halves to have a certain number of arches 418 and each arch to have a desired thickness and width, the weight of the outer metallic device can be controlled to ensure enough negative buoyancy for the node, so that the node falls freely to the ocean bottom before being used. Also, the metallic nature of the outer metallic device ensures a good coupling (acoustic coupling) with the ocean bottom, which is desired when measuring the particle velocity or acceleration. Further, even if the outer metallic halves corrode in time, the inner polymeric halves will not, which make the overall structural integrity of the node to remain intact when used in salty water. As the outer metallic halves show corrosion signs, the outer metallic halves could be replaced with the new outer metallic halves, while maintaining the inner polymeric halves and its electronics. Thus, in terms of maintenance, a hybrid node that has an internal polymeric casing and an outer metallic device is cheaper than a fully metallic node and is more reliable than a fully polymeric node.

According to embodiments, as reminded above in the embodiment of FIG. 6, there is no contact between the metallic arches and the polymeric inner casing. Contact between the metallic device and the polymeric inner casing is made at the level of the metallic belt with the external collar of the polymeric inner casing and provide corresponding reinforcement for the polymeric inner casing, preferably along with a texturing (for instance including ribs) of the external surface of the polymeric inner casing.

Figure 10:
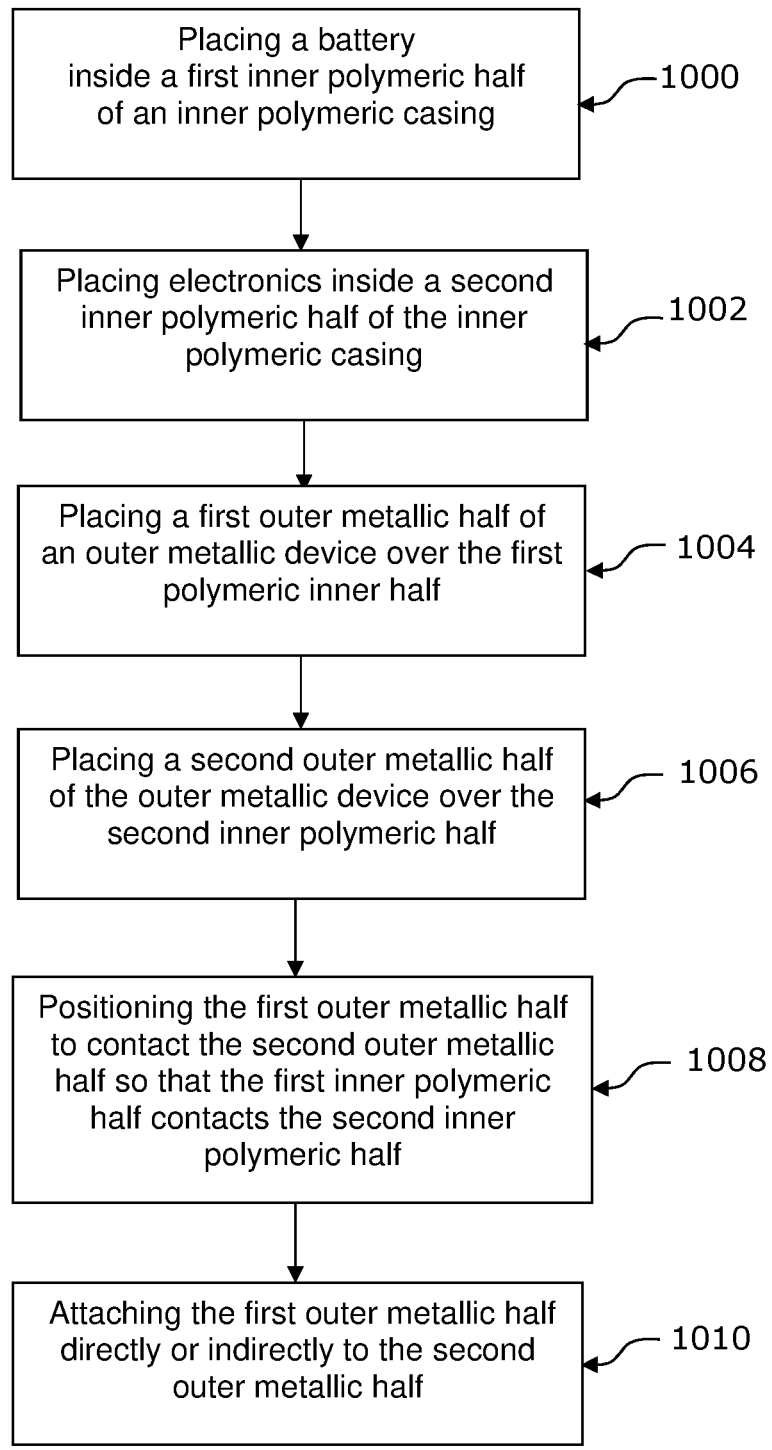
FIG. 10 is a flowchart of a method according to an embodiment of the invention, for assembling a hybrid ocean bottom node that has an inner polymeric casing and an outer metallic device, such as the node of any one of FIGS. 2 to 9.

A method for assembling the ocean bottom node 400 is now discussed with regard to FIG. 10. The method includes a step 1000 of placing the battery 440 inside the first inner polymeric half 412A of the inner polymeric casing 412, which is made of a polymeric material, a step 1002 of placing electronics 444 inside the second inner polymeric half 412B of the inner casing 412, a step 1004 of placing the first outer metallic half 414A of the outer metallic device 414, which is made of a metallic material, over the first polymeric inner half 412A. Preferably, grooves 416 formed in the outer surface of the first inner polymeric half 412A receive corresponding arches 418 formed in the first outer metallic half 414A. The method further comprises a step 1006 of placing the second outer metallic half 414B of the outer metallic reinforcing device 414 over the second inner polymeric half 412B. Preferably, grooves 416 formed in the outer surface of the second inner polymeric half 412B receive corresponding arches 418 formed in the second outer half 414A. At step 1008 the first outer metallic half 414A is positioned to contact the second outer metallic half 414B so that the first inner polymeric half 412A contacts the second inner polymeric half 412B. The method can then include a step 1010 of attaching, preferably with screws 436, the first outer metallic half 414A directly to the second outer metallic half 414B or indirectly, for instance by having the screws that pass through the holes that are machined, without threads, in an external collar of the inner polymeric casing.

The outer metallic device 414 is not water tight, i.e., it has holes that allow the water to reach the inner casing, but the inner polymeric casing is water tight. The first and second inner polymeric halves 412A, 412B are connected to each other exclusively due to the first and second outer metallic halves being attached to each other by screws.

The disclosed embodiments provide a hybrid metal-polymeric ocean bottom node that is configured to collect seismic data when deployed in a transition zone, i.e., a zone where the depth of the ocean bottom is less than 100 m. Although the term "ocean" is used in this application, one skilled in the art would understand that the OBN can be deployed in a lake, pond, brackish water, river, etc., i.e., any body of water. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The invention claimed is:

1. A seismic data acquisition device, also referred to as an ocean bottom node, intended to be placed on an ocean bottom floor, comprising:
 a polymeric inner casing defining an interior chamber that houses within at least part of a data acquisition system; and
 a metallic outer device in which the polymeric inner casing is trapped, the metallic outer device comprising two halves that are configured to be attached to each other with a fixation system, in a detachable manner, and each half includes metallic beams that extend on opposite sides of the polymeric inner casing.

2. The seismic data acquisition device of claim 1, wherein each half of the metallic outer device further comprises two joining parts that join the metallic beams to form a metallic belt that girdles the polymeric inner casing.

3. The seismic data acquisition device of claim 1, wherein each half of the metallic outer device further comprises metallic arches that extend transversally from one metallic beam to the other metallic beam.

4. The seismic data acquisition device of claim 1, wherein the polymeric inner casing has two halves.

5. The seismic data acquisition device of claim 4, wherein each half of the polymeric inner casing has an external collar element adapted to contact a corresponding external collar element of the other half, when the two halves of the polymeric inner casing are assembled, to form said external collar of the polymeric inner casing.

6. The seismic data acquisition device of claim 5, wherein passing holes are machined through the external collar elements and threaded holes are machined in at least one of the metallic beams,
 the halves of the metallic outer device being connected one to the other by screws that pass through the passing holes of the external collar elements to attach the metallic beams together while sandwiching the external collar elements.

7. The seismic data acquisition device of claim 6, wherein the passing holes machined inside the external collar elements are not threaded so that the screws extend from a metallic beam through the external collar elements without being fixed to the external collar elements, to cooperate with corresponding threaded holes machined in the other corresponding metallic beam, so that the external collar elements are maintained one against the other by the pressure applied by the metallic beams that sandwich said external collar elements.

8. The seismic data acquisition device of claim 1, wherein the seismic data acquisition device comprises a protection bumper that is fixed to the metallic outer device, the protective bumper covering part of the polymeric inner casing.

9. The seismic data acquisition device of claim 8, wherein the protection bumper has two halves that are separated by the metallic beams of the metallic outer device.

10. The seismic data acquisition device of claim 8, wherein the protection bumper has holes enabling water to enter the protection bumper.

11. The seismic data acquisition device of claim 1, wherein the polymeric casing is made of polyurethane, polypropylene, polyethylene or polyamide.

12. The seismic data acquisition device of claim 1, wherein the polymeric inner casing is reinforced by glass fibers incorporated in the polymer.

13. The seismic data acquisition device of claim 1, wherein the metallic outer device is made of copper alloy.

14. The seismic data acquisition device of claim 1, wherein the device includes a hydrophone that is attached to the polymeric inner casing, to electrically communicate with electronics embedded in the polymeric inner casing.

15. The seismic data acquisition device of claim 1, wherein said at least part of the data acquisition system that is housed in the polymeric inner casing includes a management card configured to communicate through a port with at least one of a power source and a data server on shore, the port being closed with a cap, when the node is deployed in water, to prevent the water to reach any electrical contact.

16. A method for assembling a seismic data acquisition device, also referred to as an ocean bottom node, intended to be placed on an ocean bottom floor, the method comprising:

providing a data acquisition system and a polymeric inner casing that houses at least part of the data acquisition system within an inner chamber of the polymeric inner casing; and providing a metallic outer device that comprises two halves that are configured to be attached to each other with a fixation system, in a detachable manner, and each half includes metallic beams adapted to extend on opposite sides of the polymeric inner casing; and imprisoning the polymeric inner casing into the metallic outer device.

17. A method for seabed seismic data acquisition, the method comprising the steps of:

providing a seismic data acquisition device, according to claim 1; and placing the seismic data acquisition device on an ocean bottom floor.

18. The method of claim 17, wherein the seismic data acquisition device is placed on an ocean bottom floor, at a water depth between 100 and 700 meters.

19. The seismic data acquisition device of claim 1, wherein the metallic outer device further comprises two joining parts that join the metallic beams to form a metallic belt that girdles a middle zone of the polymeric inner casing.

* * * * *